US012334576B2

(12) United States Patent
Dong

(10) Patent No.: US 12,334,576 B2
(45) Date of Patent: Jun. 17, 2025

(54) ENERGY STORAGE CABINET AND ENERGY STORAGE DEVICE

(71) Applicant: Hithium Tech HK Limited, Kowloon (HK)

(72) Inventor: Qingwen Dong, Fujian (CN)

(73) Assignee: HITHIUM TECH HK LIMITED, Kowloon (HK)

( * ) Notice: Subject to any disclaimer, the term of this patent is extended or adjusted under 35 U.S.C. 154(b) by 0 days.

(21) Appl. No.: 18/384,140

(22) Filed: Oct. 26, 2023

(65) Prior Publication Data

US 2024/0113372 A1 Apr. 4, 2024

Related U.S. Application Data

(63) Continuation of application No. PCT/CN2022/143940, filed on Dec. 30, 2022.

(30) Foreign Application Priority Data

Sep. 29, 2022 (CN) .......................... 202211203198.4

(51) Int. Cl.
*H01M 50/244* (2021.01)
*H01M 50/251* (2021.01)
*H01M 50/262* (2021.01)

(52) U.S. Cl.
CPC ....... *H01M 50/244* (2021.01); *H01M 50/251* (2021.01); *H01M 50/262* (2021.01); *H01M 2220/10* (2013.01)

(58) Field of Classification Search
CPC . H01M 50/244; B65D 25/22; B65D 90/0033; B65D 2501/24942; B65D 2519/00786; H05K 5/02

(Continued)

(56) References Cited

U.S. PATENT DOCUMENTS

| 5,943,838 A * | 8/1999 | Madsen | E04B 2/789 52/656.1 |
| 6,983,704 B1 * | 1/2006 | Ness | B65D 19/06 108/55.3 |

(Continued)

FOREIGN PATENT DOCUMENTS

| CN | 101234695 A | 8/2008 |
| CN | 206272990 U | 6/2017 |

(Continued)

OTHER PUBLICATIONS

International Search Report dated Jun. 1, 2023 issued in PCT/CN2022/143940.

(Continued)

*Primary Examiner* — Christopher Garft
(74) *Attorney, Agent, or Firm* — Scully, Scott, Murphy & Presser, P.C.

(57) ABSTRACT

Energy storage cabinet and energy storage device are provided. The energy storage cabinet includes: a plurality of columns, a plurality of beams, and a plurality of lifting assemblies. The plurality of columns is arranged at intervals. Each of the beams is connected between two adjacent columns. The plurality of columns and the plurality of beams jointly enclose to form an accommodating space. The plurality of lifting assemblies is connected to the plurality of columns respectively. The lifting assembly includes a lifting plate. The lifting plate is provided with a lifting hole. The lifting hole is used to be hooked by a hook of a lifting machine to lift the energy storage cabinet.

18 Claims, 6 Drawing Sheets

(58) Field of Classification Search
USPC .......................................... 248/544; 294/68.1
See application file for complete search history.

(56) References Cited

U.S. PATENT DOCUMENTS

| | | | | |
|---|---|---|---|---|
| 9,216,841 | B1* | 12/2015 | Ness | B65D 19/08 |
| 2009/0314791 | A1* | 12/2009 | Hartley | B65D 90/0033 |
| | | | | 294/68.1 |
| 2010/0187192 | A1* | 7/2010 | Ness | B65D 88/022 |
| | | | | 211/71.01 |
| 2013/0087217 | A1* | 4/2013 | Ness | B65D 88/022 |
| | | | | 220/500 |
| 2013/0181464 | A1* | 7/2013 | Ness | B65D 90/24 |
| | | | | 294/68.1 |
| 2014/0028037 | A1* | 1/2014 | Ness | B65D 90/0033 |
| | | | | 294/68.1 |
| 2016/0012926 | A1* | 1/2016 | Lehnert | G21F 5/06 |
| | | | | 250/506.1 |
| 2016/0332813 | A1* | 11/2016 | Navarre | B66C 23/206 |
| 2017/0275093 | A1* | 9/2017 | Oltman | B65D 90/14 |
| 2018/0257815 | A1* | 9/2018 | Lim | B65D 19/08 |
| 2020/0062447 | A1* | 2/2020 | Ness | B65D 19/10 |

FOREIGN PATENT DOCUMENTS

| | | | |
|---|---|---|---|
| CN | 206293777 | U | 6/2017 |
| CN | 207338994 | U | 5/2018 |
| CN | 207587798 | U | 7/2018 |
| CN | 208538960 | U | 2/2019 |
| CN | 109616889 | A | 4/2019 |
| CN | 208939351 | U | 6/2019 |
| CN | 209618676 | U | 11/2019 |
| CN | 211475097 | U | 9/2020 |
| CN | 111981200 | A | 11/2020 |
| CN | 212366092 | U | 1/2021 |
| CN | 212430144 | U | 1/2021 |
| CN | 213816299 | U | 7/2021 |
| CN | 215594719 | U | 1/2022 |
| CN | 114614176 | A | 6/2022 |
| CN | 217062375 | U | 7/2022 |
| CN | 217116610 | U | 8/2022 |
| CN | 115513591 | A | 12/2022 |
| JP | 2010133121 | A | 6/2010 |
| JP | 2020133155 | A | 8/2020 |
| KR | 101568276 | B1 | 11/2015 |

OTHER PUBLICATIONS

Notice of Allowance dated Sep. 19, 2023 issued in CN 202211203198.4.

Extended European Search Report dated Dec. 3, 2024 issued in EP Application No. 22940962.8.

* cited by examiner

US 12,334,576 B2

ENERGY STORAGE CABINET AND ENERGY STORAGE DEVICE

CROSS-REFERENCE OF RELATED APPLICATIONS

The present application is a Continuation Application of International application No. PCT/CN2022/143940, filed on Dec. 30, 2022, which claims the benefit of priority to Chinese Application No. 202211203198.4, titled "energy storage cabinet and energy storage device" filed on Sep. 29, 2022, the entire contents of which are incorporated herein by reference.

TECHNICAL FIELD

The disclosure relates to the field of new energy technology, and in particular to an energy storage cabinet and an energy storage device.

BACKGROUND

The energy storage cabinet is a cabinet used to store battery module. The energy storage cabinet usually includes columns and beams. The columns and beams enclose to form an accommodating chamber for storing battery module.

After storing battery module in the accommodating chamber of the energy storage cabinet, the weight is relatively heavy. In order to facilitate the handling of the energy storage cabinet with battery module, a lifting assembly for the lifting machine is usually set on the beam to facilitate the lifting assembly to be hooked by a hook of a lifting machine to lift the energy storage cabinet.

SUMMARY

According to a first aspect of the disclosure, an energy storage cabinet is provided, including: a plurality of columns arranged at intervals; a plurality of beams, each connected between two adjacent columns, wherein the plurality of columns and the plurality of beams jointly enclose to form an accommodating space; and a plurality of lifting assemblies connected to the plurality of columns respectively, wherein the lifting assembly includes a lifting plate, the lifting plate is provided with a lifting hole, and the lifting hole is used to be hooked by a hook of a lifting machine to lift the energy storage cabinet.

According to a second aspect of the present disclosure, an energy storage device is provided, including the energy storage cabinet according to the first aspect.

BRIEF DESCRIPTION OF THE DRAWINGS

In order to provide a clearer explanation of the technical solution in the embodiments of the present disclosure, a brief introduction will be given to the accompanying drawings required in the embodiments. Apparently, the accompanying drawings in the following description are only some embodiments of the present disclosure. For those skilled in the art, other accompanying drawings can be obtained based on these drawings without any creative effort.

MAIN REFERENCE SIGNS

1—Column; 10—Accommodating space; 11—Clamping part; 111—First hole wall; 112—Second hole wall; 12—Insertion hole; 13—First insertion hole; 14—Second insertion hole; 15—Opening;
2—Beam;
3—Lifting assembly; 31—Lifting plate; 311—Lifting hole; 312—First plate part; 3121—thickened plate; 313—Second plate part; 314—reinforcing plate part; 32—Clamping plate; 321—Third plate part; 322—Fourth plate part; 323—Fifth plate part; 33—Bolt;
100—Energy storage cabinet.

DETAILED DESCRIPTION

The technical solution in the embodiments of the present disclosure will be clearly and completely described below in combination with the drawings in the embodiments of the present disclosure. Obviously, the described embodiments are only a part of the embodiments of the present disclosure, not all of the embodiments. Based on the embodiments of the present disclosure, all other embodiments obtained by those skilled in the art without creative labor belong to the protection scope of the present disclosure.

Furthermore, in addition to indicating azimuth or positional relationship, some of the above terms may also be used for other meaning. For example, in some cases, the term "above" may be used to indicate a dependency or connection relationship. For those skilled in the art, the specific meaning of these terms in the present disclosure can be understood according to the specific circumstances.

In addition, the terms "first", "second", etc. are primarily used to distinguish between different devices, elements, or components, of the same or different kind and construction, and are not used to indicate or imply the relative importance and quantity of the device, element, or component. Unless otherwise stated, "a plurality of" means two or more.

Hereinafter, the technical solution of the present disclosure will be further explained in combination with the embodiments and the drawings.

Embodiment 1

Figure 1:
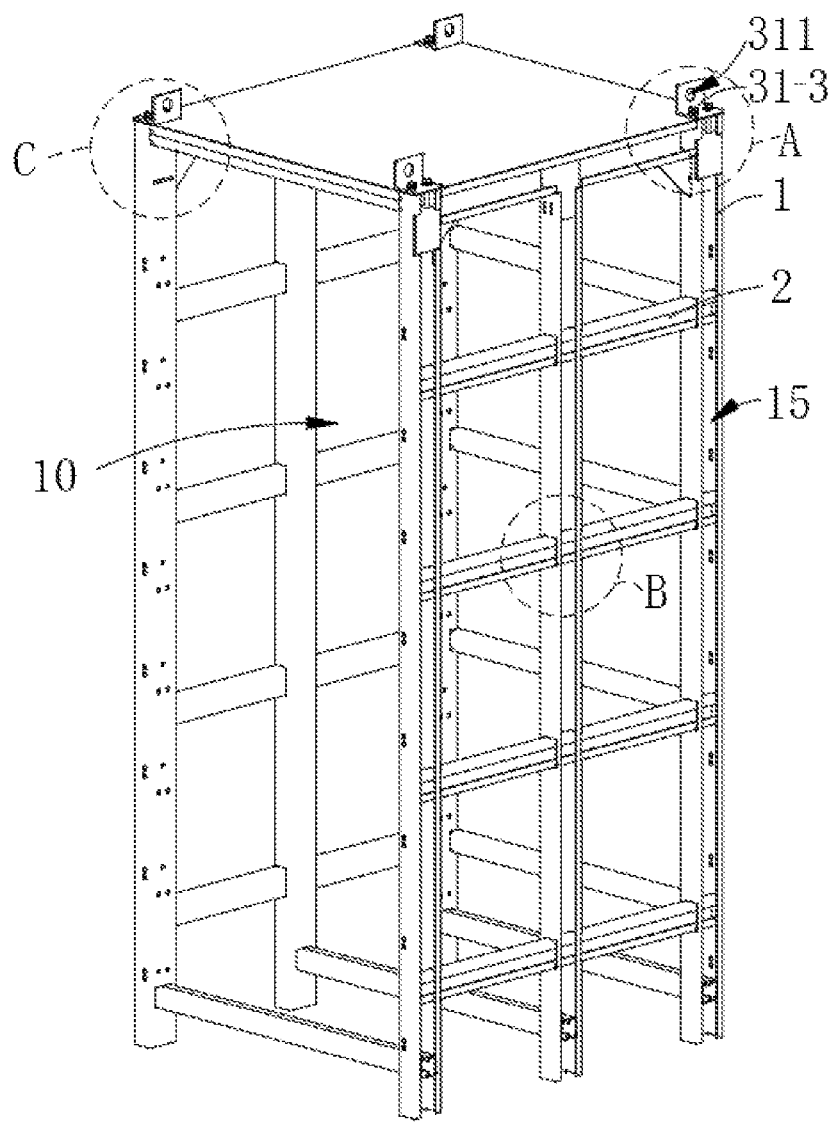
FIG. 1 is a structural schematic diagram of an energy storage cabinet provided by the embodiment of the present disclosure.
Figure 2:
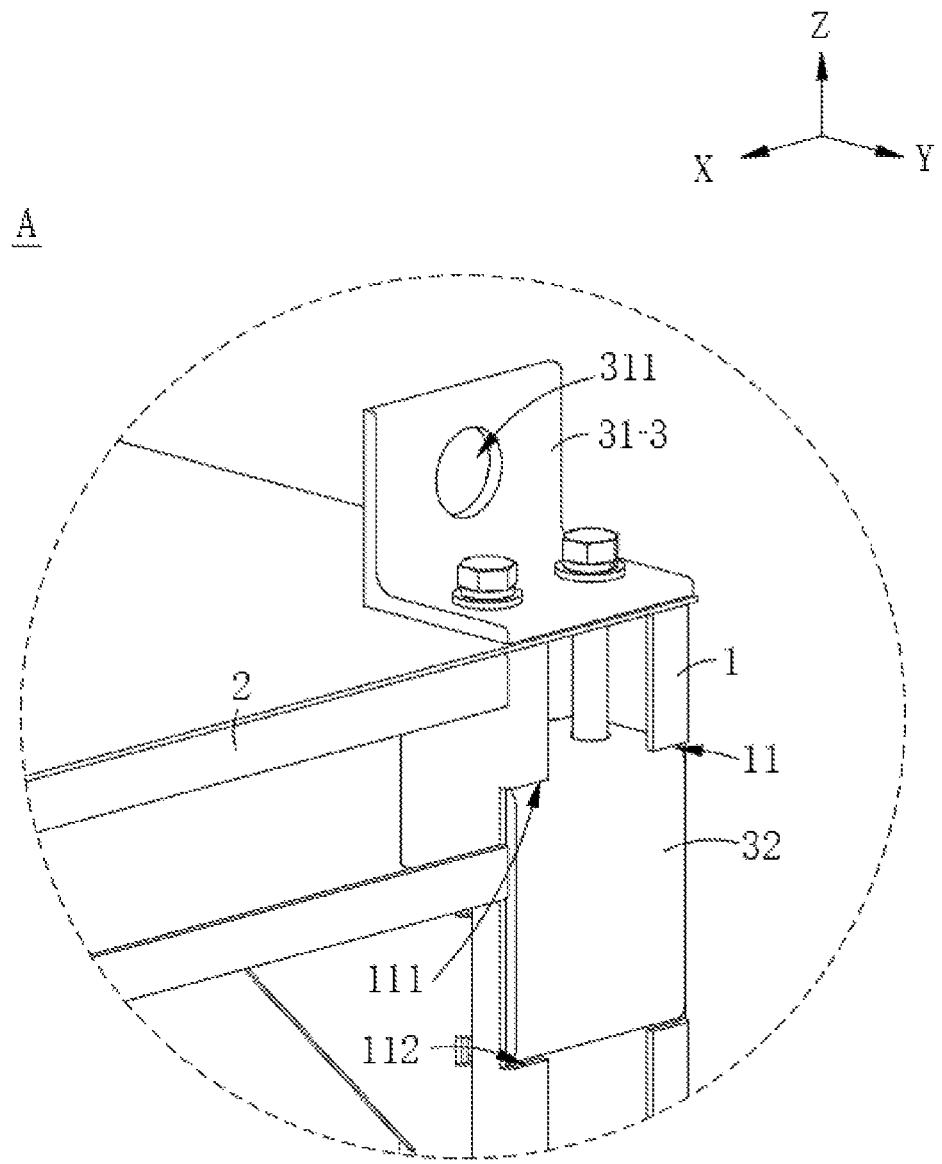
FIG. 2 is a partial enlarged view of the energy storage cabinet in FIG. 1 at position A.

FIG. 1 is a structural schematic diagram of an energy storage cabinet provided by the embodiment of the present disclosure, and FIG. 2 is a partial enlarged view of the energy storage cabinet in FIG. 1 at position A.

With reference to FIGS. 1 and 2, the energy storage cabinet 100 includes: a plurality of columns 1, a plurality of beams 2, and a plurality of lifting assemblies 3. The plurality of columns 1 are arranged at intervals, each beam 2 is connected between two adjacent columns 1, and the plurality of columns 1 and the plurality of beams 2 jointly enclose to form an accommodating space 10 for storing battery module. The plurality of lifting assemblies 3 are connected to the plurality of columns 1 respectively. The lifting assembly 3 includes a lifting plate 31. A lifting hole 311 is provided on the lifting plate 31, and the lifting hole 311 is used to be hooked by a hook of a lifting machine to lift the energy storage cabinet 100.

In the embodiment of the present disclosure, since the plurality of columns 1 and the plurality of beams 2 can jointly enclose to form the accommodating space 10, a battery module can be stored in the accommodating space 10. After the battery module is stored in the accommodating space 10, the energy storage cabinet 100 will be heavy.

Considering that the energy storage cabinet 100 is not easy to handle when it is heavy, a lifting assembly 3 can be connected to each column 1. Specifically, the lifting assembly 3 may include a lifting plate 31, and a lifting hole 311 is provided on the lifting plate 31. In this manner, the lifting hole 311 may be hooked by a hook of a lifting machine to lift the energy storage cabinet 100, thereby facilitating the handling of the energy storage cabinet 100.

However, since the energy storage cabinet 100 is heavy, when the energy storage cabinet 100 is lifted by hooking the lifting hole 311 through the hook of the lifting machine, the pulling force of the lifting machine will be large, which in turn will cause the force transmitted to the column 1 through the lifting assembly 3 to be large.

The inventor found that when each lifting assembly 3 is connected to the corresponding column 1, so that the pull force of the lifting machine is transmitted to the column 1 through the lifting assembly 3, the column 1 is subjected to a larger force, while the connection between the column 1 and the beam 2 is subjected to a smaller force. In general, the column 1 will bear a larger force, while the connection between the column 1 and the beam 2 will bear a smaller force. In this way, when the hook of the lifting machine hooks the lifting hole 311 to lift the energy storage cabinet 100, the connection between the column and the beam will not break.

In the related art, the lifting assembly 3 is disposed on the beam 2, so that the pull force of the lifting machine is transmitted to the beam 2 through the lifting assembly 3, and then to the column 1 through the beam 2, so that the connection between the beam 2 and the column 1 is subjected to a larger force. Therefore, it is easy for the connection between the column and the beam to break.

In the embodiment of the present disclosure, a plurality of lifting assemblies 3 are connected to a plurality of columns 1 respectively, so that when the hook of the lifting machine hooks the lifting hole 311 to lift the energy storage cabinet 100, the column 1 will bear a larger force and the connection between the column 1 and the beam 2 will bear a smaller force. Therefore, the connection between the column and the beam will not break.

It should be noted that, in some embodiments, referring to FIG. 1, the number of the above-mentioned columns 1 may be four, and the four columns 1 may jointly enclose to form a rectangular structure, so that the shape of the energy storage cabinet 100 may be relatively regular and convenient for processing.

Of course, the number of columns 1 may be other numbers, such as 5 or 6, which is not limited in the embodiment of the present disclosure.

The lifting assembly 3 can be connected to any position of the column 1, as long as the lifting assembly 3 is connected to the column 1, which is not limited in the embodiment of the present disclosure.

In some exemplary embodiments, referring to FIG. 1, the lifting assembly 3 may be connected to the top end of the column 1. When the lifting assembly 3 is connected to the top end of the column 1, when the hook of the lifting machine hooks the lifting hole 311 to lift the energy storage cabinet 100, the possibility of tilting and toppling over of the energy storage cabinet 100 may be reduced.

It should be noted that the column 1 may be a steel pipe or a profile pipe, etc. When the column 1 is a steel pipe or a profile pipe, due to the mature processing technology and the low cost of the steel pipe and the profile pipe, the processing difficulty and cost of the column 1 can be reduced to a certain extent.

Specifically, when the column 1 is a steel pipe or a profile pipe, the column 1 can be understood as a hollow tubular structure with a rectangular cross-section. When the column 1 is a hollow tubular structure, the entire column 1 may be relatively light, and the weight of the entire energy storage cabinet 100 may be reduced.

When the column 1 is a hollow tubular structure with a rectangular cross-section, the structure of the column 1 has many possibilities. In the first possible structure, all four surfaces of the column 1 are closed. In the second possible structure, referring to FIG. 1, one of the four surfaces of the column 1 may also be provided with an opening 15, thereby forming the column 1 with the opening 15.

When the column 1 is the above-mentioned column 1 with the opening 15, on the one hand, the weight of the column 1 can be further reduced. On the other hand, various mechanical structures can be conveniently accommodated in the inner cavity of the column 1 through the opening 15, so that the appearance of the column 1 is neat.

The structure of the beam 2 may be the same as or similar to the structure of the column 1. For details, refer to the description of the column 1 above. The beam 2 will not be described in the embodiment of the present disclosure.

It should be noted that, the lifting assembly 3 includes a lifting plate 31. The lifting plate 31 is provided with a lifting hole 311 hooked by a hook of a lifting machine to lift the energy storage cabinet 100. That is to say, the lifting hole 311 is provided on the lifting plate 31. Compared to the method of forming the lifting hole 311 by bending steel bar, providing the lifting hole 311 on the lifting plate 31 can make the lifting hole 311 have a stronger ability to withstand force, making it less likely for the lifting hole 311 to deform when the hook of the lifting machine hooks the lifting hole 311 to lift the energy storage cabinet 100.

The shape of the lifting hole 311 may be circular or square, etc., which is not limited in the embodiment of the present disclosure. When the shape of the lifting hole 311 is circular, compared to the rectangular lifting hole 311, the lifting hole 311 has no sharp edges and corners, so that the hole wall of the lifting hole 311 is relatively smooth. Therefore, the hook of the lifting machine can be inserted into the lifting hole 311 more easily.

Of course, the lifting hole 311 may be of other possible shapes, which is not limited in the embodiment of the present disclosure.

It is to be noted that, the column 1 is subjected to a larger pull force and the beam 2 is subjected to a smaller pull force. Therefore, in some embodiments, the cross sectional area of the beam 2 can be made smaller than the cross sectional area of the column 1, so that the cross sectional area of the beam 2 can be reduced as much as possible while ensuring that the energy storage cabinet 100 will not deform, thereby reducing the material cost of the beam 2, and thus achieving the goal of reducing the manufacturing cost of the energy storage cabinet 100.

Figure 4:
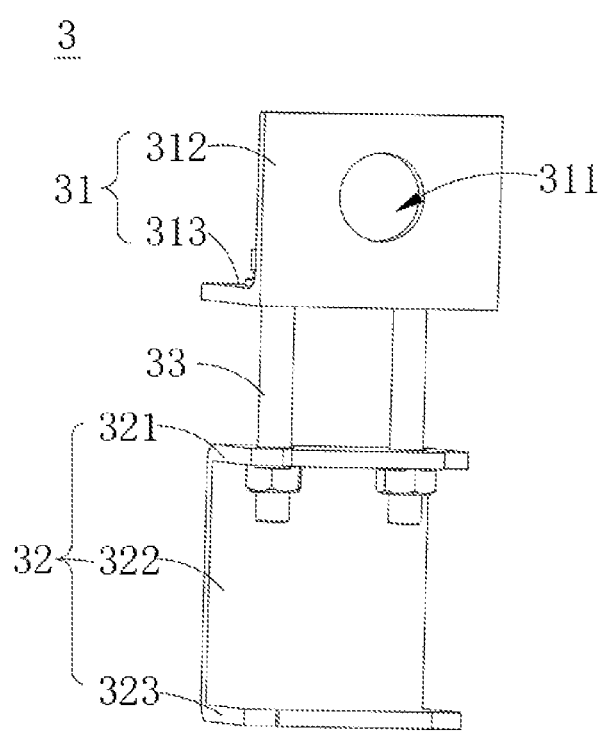
FIG. 4 is a structural schematic diagram of a lifting assembly provided by the embodiment of the present disclosure.

In some embodiments, referring to FIGS. 2 and 4, the lifting plate 31 includes a first plate part 312 and a second plate part 313 which are connected substantially vertically to each other. The lifting hole 311 is provided on the first plate part 312, and the second plate part 313 is connected to the top end of the column 1.

By making the lifting plate 31 include the first plate part 312 and the second plate part 313 which are connected substantially vertically to each other, the first plate part 312 and the second plate part 313 can jointly form an L-shaped structure. Since the L-shaped structure is more stable, the lifting plate 31 can be made less prone to deformation and more stable.

The lifting hole 311 is arranged on the first plate part 312, and the second plate part 313 is connected to the top end of the column 1, so that the lifting hole 311 and the second plate part 313 can be respectively located on different surfaces. In this way, mutual interference between the lifting hole 311 and the second plate part 313 can be avoided or reduced.

Further, in some embodiments, referring to FIGS. 1 and 2, the first plate part 312 is located on the side of the second plate part 313 which is closer to the accommodating space 10. By locating the first plate part 312 on the side of the second plate part 313 which is closer to the accommodating space 10, the lifting hole 311 can be located on the side of the second plate part 313 which is closer to the accommodating space 10. In this way, the lifting hole 311 can be located closer to the center of gravity of the entire energy storage cabinet 100, and the force applied to the lifting hole 311 can be reduced, thereby avoiding deformation of the lifting hole 311.

Figure 3:
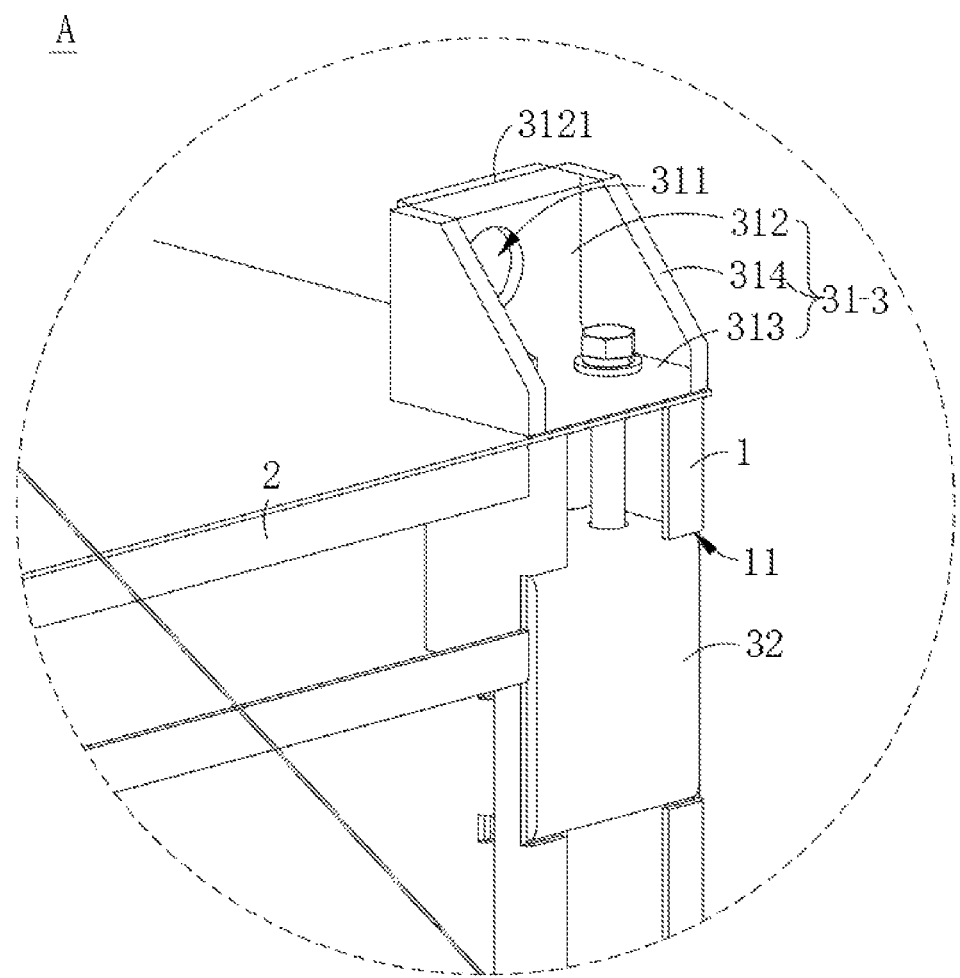
FIG. 3 is a partial enlarged view of another energy storage cabinet provided by the embodiment of the present disclosure at position A.

In some embodiments, referring to FIG. 3, a thickened plate 3121 is provided on the first plate part 312, and a lifting hole 311 also penetrates through the thickened plate 3121. By providing a thickened plate 3121 on the first plate part 312 and allowing the lifting hole 311 to penetrate through the thickened plate 3121, the position of the lifting hole 311 can be made more robust, thereby avoiding deformation or damage of the lifting hole 311.

In order to strengthen the connection between the first plate part 312 and the second plate part 313, in some embodiments, referring to FIG. 3, the lifting plate 31 further includes a reinforcing plate part 314 which is connected to the first plate part 312 and the second plate part 313, respectively. By connecting the reinforcing plate part 314 to the first plate part 312 and the second plate part 313 respectively, the connection between the first plate part 312 and the second plate part 313 can be strengthened, thereby preventing the connection between the first plate part 312 and the second plate part 313 from breaking.

Further, in some embodiments, the reinforcing plate part 314 is substantially a right-angled triangle, with the first right-angled side of the reinforcing plate part 314 connected to the first plate part 312, and the second right-angled side of the reinforcing plate part 314 connected to the second plate part 313. Due to the structural stability of the right-angled triangle, the connection between the first plate part 312 and the second plate part 313 can be made more secure by connecting the first right-angled side of the reinforcing plate part 314 to the first plate part 312 and connecting the second right-angled side of the reinforcing plate part 314 to the second plate part 313.

The number of the reinforcing plates 314 may be two and arranged oppositely. Of course, the number of the reinforcing plates 314 may also be other numbers, which is not limited in the embodiment of the present disclosure.

In some embodiments, referring to FIGS. 2 and 4, the lifting assembly 3 further includes: a clamping plate 32, and the column 1 is provided with a clamping part 11 matching the clamping plate 32. The clamping plate 32 is clamped in the clamping part 11, and the lifting plate 31 is connected to the clamping plate 32.

By providing the clamping part 11 matching the clamping plate 32 on the column 1, and allowing the clamping plate 32 to be clamped in the clamping part 11, it becomes very convenient to connect the clamping plate 32 to the column 1.

The above-mentioned lifting plate 31 and clamping plate 32 may be connected in various ways. In one possible embodiment, referring to FIG. 4, the lifting plate 31 is connected to the clamping plate 32 by bolts 33. When the lifting plate 31 is connected to the clamping plate 32 by the bolts 33, on the one hand, it becomes very convenient to connect the lifting plate 31 and the clamping plate 32, and on the other hand, it also facilitates the removal between the lifting plate 31 and the clamping plate 32.

The number of bolts 33 may be 2, 3 or 4, and the number of bolts 33 is not limited in the embodiment of the present disclosure.

In some embodiments, referring to FIG. 4, the clamping plate 32 includes a third plate part 321, a fourth plate part 322, and a fifth plate part 323 which are sequentially connected to each other. The third plate part 321, the fourth plate part 322, and the fifth plate part 323 jointly form a U-shaped structure, and the lifting plate 31 is connected to the third plate part 321.

When the third plate part 321, the fourth plate part 322 and the fifth plate part 323 jointly form a U-shaped structure, and the lifting plate 31 is connected to the third plate part 321, although the third plate part 321 is directly subjected to the force from the lifting plate 31, the fourth plate part 322 and the fifth plate part 323 can jointly improve the strength of the third plate part 321, so that the strength of the entire clamping plate 32 is higher, thereby making the entire clamping plate 32 less likely to deform.

In some embodiments, referring to FIGS. 1 and 2, the opening of the U-shaped structure faces the accommodating space 10. By making the opening of the U-shaped structure face the accommodating space 10, on the one hand, the surface of the clamping plate 32 facing outside can be made relatively smooth, making it less likely to scratch the user. On the other hand, the third plate part 321, the fourth plate part 322, the fifth plate part 323, and the column 1 can jointly enclose to form a closed cavity, making it difficult to hide dirt and dust. On the other hand, it has been found by the inventor that the clamping plate 32 can be made stronger and less prone to deformation.

Of course, in other embodiments, the opening of the U-shaped structure may also face the side away from the accommodating space 10, which is not limited by the embodiment of the present disclosure.

In some embodiments, with reference to FIG. 2, the clamping part 11 is a rectangular hole including a first hole wall 111 and a second hole wall 112 arranged oppositely along an extension direction (Z-axis direction in FIG. 2) of the column 1. The third plate part 321 abuts the first hole wall 111, and the first hole wall 111 is located on the side of the second hole wall 112 closer to the lifting assembly 3 along an extension direction of the column 1.

Since the third plate part 321 is connected to the lifting plate 31, the third plate part 321 will be subjected to an upward pull force from the lifting plate 31. Therefore, by making the third plate part 321 abut against the first hole wall 111, the first hole wall 111 can provide a downward blocking force to the third plate part 321 along the extension direction of the column 1, so that the third plate part 321 can be connected to the first hole wall 111 very stably, thereby preventing the clamping plate 32 from sliding out of the clamping part 11.

Figure 5:
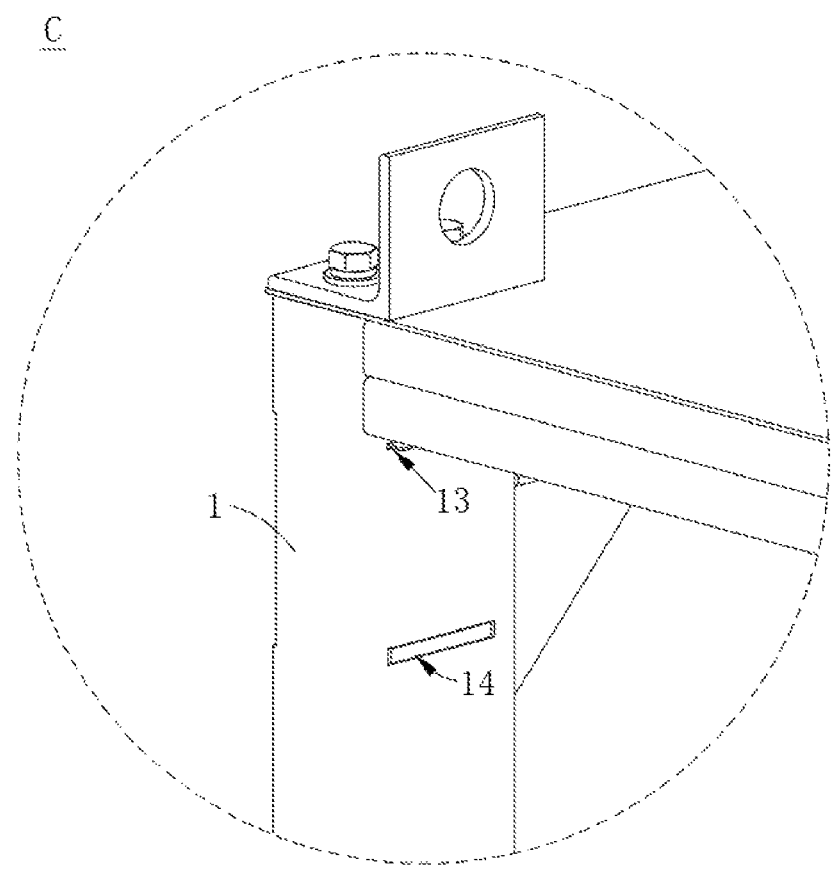
FIG. 5 is a partial enlarged view of the energy storage cabinet in FIG. 1 at position C.

In order to enable the clamping plate 32 to be more stably clamped in the clamping part 11, in some embodiments, referring to FIGS. 4 and 5, the column 1 is provided with a first insertion hole 13 corresponding to the third plate part 321 and a second insertion hole 14 corresponding to the fifth plate part 323. The third plate part 321 is inserted into the first insertion hole 13 and the fifth plate part 323 is inserted into the second insertion hole 14. By inserting the third plate part 321 into the first insertion hole 13, and inserting the fifth plate part 323 into the second insertion hole 14, the first insertion hole 13 and the second insertion hole 14 can limit the movement of the third plate part 321 and the fifth plate part 323, respectively. In this way, the clamping plate 32 can be more stably clamped in the clamping part 11.

Further, in order to enable the clamping plate 32 to be more stably clamped in the clamping part 11, in some embodiments, the third plate part 321 is welded to the first hole wall 111, and the fifth plate part 323 is welded to the second hole wall 112. In this way, the clamping plate 32 can be more stably clamped into the clamping part 11.

Figure 6:
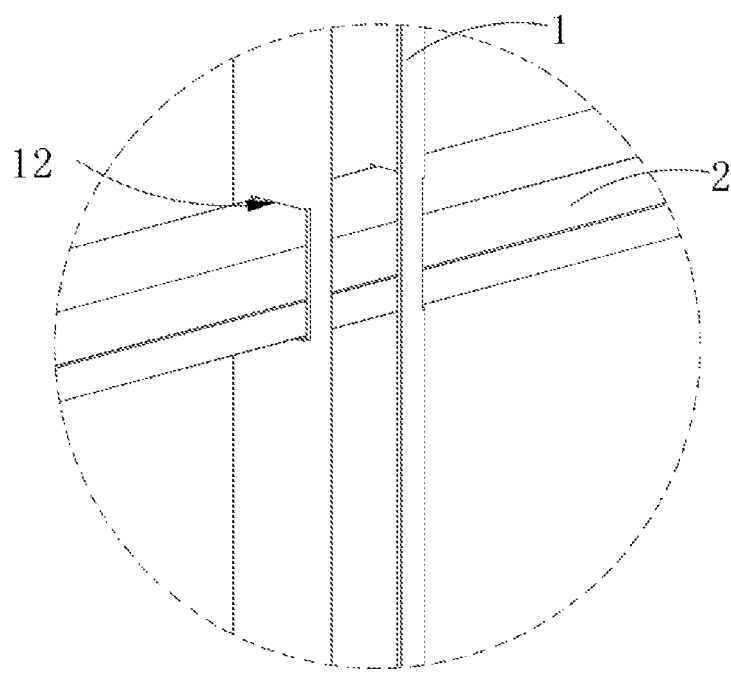
FIG. 6 is a partial enlarged view of the energy storage cabinet in FIG. 1 at position B.

In order to avoid fracture at the connection between the column 1 and the beam 2, in some embodiments, referring to FIG. 6, an insertion hole 12 is provided on the column 1, and the beam 2 is inserted into the insertion hole 12 and welded to the column 1. By inserting the beam 2 into the insertion hole 12 on the column 1 and by welding to the column 1, the connection between the column 1 and the beam 2 is made more secure by welding, in addition to the fixing of the connection between the column 1 and the beam 2 by the insertion hole 12. That is, the connection between the column 1 and the beam 2 is doubling fixed by means of the insertion hole 12 and the welding, so that the fracture at the connection between the column 1 and the beam 2 can be avoided.

In conclusion, in the embodiment of the present disclosure, a plurality of lifting assemblies 3 and a plurality of columns 1 are arranged in one-to-one correspondence. Each lifting assembly 3 is connected to a corresponding column 1, so that when the hook of the lifting machine hooks the lifting hole 311 to lift the energy storage cabinet 100, the column 1 will bear a larger force while the connection between the column 1 and the beam 2 will bear a smaller force. Therefore, the connection between the column and the beam will not break.

In addition, by making the cross sectional area of the beam 2 smaller than the cross sectional area of the column 1, the cross sectional area of the beam 2 can be reduced as much as possible while ensuring that the energy storage cabinet 100 does not deform, thereby reducing the material cost of the beam 2, and thus achieving the goal of reducing the manufacturing cost of the energy storage cabinet 100.

Embodiment 2

The embodiment of the present application provides an energy storage device, including energy storage cabinet 100.

The energy storage cabinet 100 may have the same structure as any energy storage cabinet 100 in the above Embodiment 1, and may have the same or similar beneficial effects. For details, refer to the description of the energy storage cabinet in the above Embodiment 1, and the embodiment of the present application will not be repeated here.

In the embodiment of the present application, since the energy storage cabinet can avoid the fracture of the connection between the column and the beam, when the energy storage cabinet 100 is applied to the energy storage device, the energy storage device can be made stronger.

In some embodiments, the energy storage device further includes a battery module arranged in an accommodating space 10 of the energy storage cabinet 100. By providing the battery module in the accommodating space 10 of the energy storage cabinet 100, the energy storage cabinet 100 can protect the battery module from being affected by the external environment.

According to a first aspect of the disclosure, an energy storage cabinet is provided, including: a plurality of columns arranged at intervals; a plurality of beams, each connected between two adjacent columns, wherein the plurality of columns and the plurality of beams jointly enclose to form an accommodating space; and a plurality of lifting assemblies connected to the plurality of columns respectively, wherein the lifting assembly includes a lifting plate, the lifting plate is provided with a lifting hole, and the lifting hole is used to be hooked by a hook of a lifting machine to lift the energy storage cabinet.

Since the plurality of columns and the plurality of beams can jointly enclose to form the accommodating space, a battery module can be stored in the accommodating space. After the battery module is stored in the accommodating space, the energy storage cabinet will be heavy.

Considering that the energy storage cabinet is not easy to handle when it is heavy, a lifting assembly can be connected to each column. Specifically, the lifting assembly may include a lifting plate, and a lifting hole is provided on the lifting plate. In this manner, the lifting hole may be hooked by a hook of a lifting machine to lift the energy storage cabinet, thereby facilitating the handling of the energy storage cabinet.

However, since the energy storage cabinet is heavy, when the energy storage cabinet is lifted by hooking the lifting hole through the hook of the lifting machine, the pulling force of the lifting machine will be large, which in turn will cause the force transmitted to the column through the lifting assembly to be large.

The inventor found that when each lifting assembly is connected to the corresponding column, so that the pull force of the lifting machine is transmitted to the column through the lifting assembly, the column is subjected to a larger force, while the connection between the column and the beam is subjected to a smaller force. In general, the column will bear a larger force, while the connection between the column and the beam will bear a smaller force. In this way, when the hook of the lifting machine hooks the lifting hole to lift the energy storage cabinet, the connection between the column and the beam will not break.

In some embodiments, the plurality of lifting assemblies are respectively connected to top ends of the plurality of columns.

In the case that the lifting assembly is connected to the top end of the column, when the hook of the lifting machine hooks the lifting hole to lift the energy storage cabinet, the possibility of tilting and toppling over of the energy storage cabinet may be reduced.

In some embodiments, the lifting plate includes a first plate part and a second plate part connected vertically to each other, the lifting hole is arranged on the first plate part, and the second plate part is connected to the top end of the column.

By making the lifting plate include the first plate part and the second plate part which are connected substantially vertically to each other, the first plate part and the second plate part can jointly form an L-shaped structure. Since the L-shaped structure is more stable, the lifting plate can be made less prone to deformation and more stable.

The lifting hole is arranged on the first plate part, and the second plate part is connected to the top end of the column, so that the lifting hole and the second plate part can be respectively located on different surfaces. In this way, mutual interference between the lifting hole and the second plate part can be avoided or reduced.

In some embodiments, the first plate part is located on a side of the second plate part close to the accommodating space.

By locating the first plate part on the side of the second plate part close to the accommodating space, the lifting hole can be located on the side of the second plate part close to the accommodating space. In this way, the lifting hole can be located closer to the center of gravity of the entire energy storage cabinet, and the force applied to the lifting hole can be reduced, thereby avoiding deformation of the lifting hole.

In some embodiments, the first plate is provided with a thickened plate and the lifting hole penetrates through the thickened plate.

By providing a thickened plate on the first plate part and allowing the lifting hole to penetrate through the thickened plate, the position of the lifting hole can be made more robust, thereby avoiding deformation or damage of the lifting hole.

In some embodiments, the lifting plate further includes a reinforcing plate part, and the reinforcing plate part is connected to the first plate part and the second plate part, respectively.

By connecting the reinforcing plate part to the first plate part and the second plate part respectively, the connection between the first plate part and the second plate part can be strengthened, thereby preventing the connection between the first plate part and the second plate part from breaking.

In some embodiment, the reinforcing plate part is in a right-angled triangle, a first right-angled side of the reinforcing plate part is connected to the first plate part, and a second right-angled side of the reinforcing plate part is connected to the second plate part.

Due to the structural stability of the right-angled triangle, the connection between the first plate part and the second plate part can be made more secure by connecting the first right-angled side of the reinforcing plate part to the first plate part and connecting the second right-angled side of the reinforcing plate part to the second plate part.

In some embodiments, the lifting assembly further includes: a clamping plate, wherein the column is provided with a clamping part matching the clamping plate, the clamping plate is clamped in the clamping part, and the lifting plate is connected to the clamping plate.

By providing the column with the clamping part matching the clamping plate and allowing the clamping plate to be clamped in the clamping part, it becomes very convenient to connect the clamping plate to the column.

In some embodiments, the clamping plate includes a third plate part, a fourth plate part and a fifth plate part which are sequentially connected with each other, and the third plate part, the fourth plate part and the fifth plate part jointly form a U-shaped structure, and the lifting plate is connected to the third plate part.

When the third plate part, the fourth plate part and the fifth plate part jointly form a U-shaped structure, and the lifting plate is connected to the third plate part, although the third plate part is directly subjected to the force from the lifting plate, the fourth plate part and the fifth plate part can jointly improve the strength of the third plate part, so that the strength of the entire clamping plate is higher, thereby making the entire clamping plate less likely to deform.

In some embodiments, an opening of the U-shaped structure faces the accommodating space.

By making the opening of the U-shaped structure face the accommodating space, on the one hand, the surface of the clamping plate facing outside can be made relatively smooth, making it less likely to scratch the user. On the other hand, the third plate part, the fourth plate part, the fifth plate part, and the column can jointly enclose to form a closed cavity, making it difficult to hide dirt and dust. On the other hand, it has been found by the inventor that the clamping plate can be made stronger and less prone to deformation.

In some embodiments, the clamping part is a rectangular hole, the rectangular hole includes a first hole wall and a second hole wall arranged oppositely along an extension direction of the column, the third plate part abuts against the first hole wall, and the first hole wall is located on a side of the second hole wall close to the lifting assembly along the extension direction of the column.

Since the third plate part is connected to the lifting plate, the third plate part will be subjected to an upward pull force from the lifting plate. Therefore, by making the third plate part abut against the first hole wall, the first hole wall can provide a downward blocking force to the third plate part along the extension direction of the column, so that the third plate part can be connected to the first hole wall very stably, thereby preventing the clamping plate from sliding out of the clamping part.

In some embodiments, the column is provided with a first insertion hole corresponding to the third plate part and a second insertion hole corresponding to the fifth plate part, the third plate part is inserted into the first insertion hole and the fifth plate part is inserted into the second insertion hole.

By inserting the third plate part into the first insertion hole, and inserting the fifth plate part into the second insertion hole, the first insertion hole and the second insertion hole can limit the movement of the third plate part and the fifth plate part, respectively. In this way, the clamping plate can be more stably clamped in the clamping part.

In some embodiments, the third plate part is welded to the first hole wall and the fifth plate part is welded to the second hole wall.

In this way, the clamping plate can be more stably clamped into the clamping part.

In some embodiments, the lifting plate is connected to the clamping plate by bolts.

When the lifting plate is connected to the clamping plate by the bolts, on the one hand, it becomes very convenient to connect the lifting plate and the clamping plate; and on the other hand, it also facilitates the removal between the lifting plate and the clamping plate.

In some embodiments, the column is provided with an inserting hole, and the beam is inserted into the insertion hole and welded to the column.

By inserting the beam into the insertion hole on the column and by welding to the column, the connection between the column and the beam is made more secure by welding, in addition to the fixing of the connection between the column and the beam by the insertion hole. That is, the connection between the column and the beam is doubling fixed by means of the insertion hole and the welding, so that the fracture at the connection between the column and the beam can be avoided.

In some embodiments, a cross sectional area of the beam is less than a cross sectional area of the column.

The column is subjected to a larger pull force and the beam is subjected to a smaller pull force. Therefore, in some embodiments, the cross sectional area of the beam can be made smaller than the cross sectional area of the column, so that the cross sectional area of the beam can be reduced as much as possible while ensuring that the energy storage cabinet will not deform, thereby reducing the material cost of the beam, and thus achieving the goal of reducing the manufacturing cost of the energy storage cabinet.

In some embodiments, the column is a steel pipe or a profile pipe.

When the column is a steel pipe or a profile pipe, due to the mature processing technology and the low cost of the steel pipe and the profile pipe, the processing difficulty and cost of the column can be reduced to a certain extent.

According to a second aspect of the present disclosure, an energy storage device is provided, including the energy storage cabinet according to the first aspect.

Since the energy storage cabinet can avoid the fracture of the connection between the column and the beam, when the energy storage cabinet is applied to the energy storage device, the energy storage device can be made stronger.

Compared with the prior art, the present disclosure has the following beneficial effects.

Since the plurality of columns and the plurality of beams can jointly enclose to form the accommodating space, a battery module can be stored in the accommodating space. After the battery module is stored in the accommodating space, the energy storage cabinet will be heavy.

Considering that the energy storage cabinet is not easy to handle when it is heavy, a lifting assembly can be connected to each column. Specifically, the lifting assembly may include a lifting plate, and a lifting hole is provided on the lifting plate. In this manner, the lifting hole may be hooked by a hook of a lifting machine to lift the energy storage cabinet, thereby facilitating the handling of the energy storage cabinet.

However, since the energy storage cabinet is heavy, when the energy storage cabinet is lifted by hooking the lifting hole through the hook of the lifting machine, the pulling force of the lifting machine will be large, which in turn will cause the force transmitted to the column through the lifting assembly to be large.

The inventor found that when each lifting assembly is connected to the corresponding column, so that the pull force of the lifting machine is transmitted to the column through the lifting assembly, the column is subjected to a larger force, while the connection between the column and the beam is subjected to a smaller force. In general, the column will bear a larger force, while the connection between the column and the beam will bear a smaller force. In this way, when the hook of the lifting machine hooks the lifting hole to lift the energy storage cabinet, the connection between the column and the beam will not break.

The energy storage cabinet and energy storage device disclosed in the embodiments of the present disclosure are described in detail. The principle and embodiments of the present disclosure are explained by applying specific examples. The description of the above embodiments is only used to help understand the energy storage cabinet and energy storage device of the present disclosure and the core idea thereof. Meanwhile, for those skilled in the art, according to the idea of the present disclosure, there may be changes in the specific embodiments and the application scope. In conclusion, the contents of the description shall not be construed as restrictions on the present disclosure.

What is claimed is:

1. An energy storage cabinet, comprising:
    a plurality of columns arranged at intervals;
    a plurality of beams, each connected between two adjacent columns, wherein the plurality of columns and the plurality of beams jointly enclose to form an accommodating space; and
    a plurality of lifting assemblies connected to the plurality of columns respectively, wherein the lifting assembly comprises a lifting plate, the lifting plate is provided with a lifting hole, and the lifting hole is used to be hooked by a hook of a lifting machine to lift the energy storage cabinet,
    wherein the lifting assembly further comprises:
    a clamping plate, wherein the column is provided with a clamping part matching the clamping plate, the clamping plate is clamped in the clamping part, and the lifting plate is connected to the clamping plate, and
    wherein the lifting plate is connected to the clamping plate by bolts.

2. The energy storage cabinet according to claim 1, wherein the plurality of lifting assemblies are respectively connected to top ends of the plurality of columns.

3. The energy storage cabinet according to claim 2, wherein the lifting plate comprises a first plate part and a second plate part connected vertically to each other, the lifting hole is arranged on the first plate part, and the second plate part is connected to the top end of the column.

4. The energy storage cabinet according to claim 3, wherein the first plate part is located on a side of the second plate part close to the accommodating space.

5. The energy storage cabinet according to claim 3, wherein the first plate is provided with a thickened plate and the lifting hole penetrates through the thickened plate.

6. The energy storage cabinet according to claim 3, wherein the lifting plate further comprises a reinforcing plate part; and the reinforcing plate part is connected to the first plate part and the second plate part, respectively.

7. The energy storage cabinet according to claim 6, wherein the reinforcing plate part is in a right-angled triangle; a first right-angled side of the reinforcing plate part is connected to the first plate part, and a second right-angled side of the reinforcing plate part is connected to the second plate part.

8. The energy storage cabinet according to claim 1, wherein the clamping plate comprises a third plate part, a fourth plate part and a fifth plate part which are sequentially connected with each other, and the third plate part, the fourth plate part and the fifth plate part jointly form a U-shaped structure, and the lifting plate is connected to the third plate part.

9. The energy storage cabinet according to claim 8, wherein an opening of the U-shaped structure faces the accommodating space.

10. The energy storage cabinet according to claim 8, wherein the clamping part is a rectangular hole, the rectangular hole comprises a first hole wall and a second hole wall arranged oppositely along an extension direction of the column, the third plate part abuts against the first hole wall, and the first hole wall is located on a side of the second hole wall close to the lifting assembly along the extension direction of the column.

11. The energy storage cabinet according to claim 10, wherein the column is provided with a first insertion hole corresponding to the third plate part and a second insertion hole corresponding to the fifth plate part, the third plate part is inserted into the first insertion hole and the fifth plate part is inserted into the second insertion hole.

12. The energy storage cabinet according to claim 10, wherein the third plate part is welded to the first hole wall and the fifth plate part is welded to the second hole wall.

13. The energy storage cabinet according to claim 1, wherein the column is provided with an insertion hole, and the beam is inserted into the insertion hole and welded to the column.

14. The energy storage cabinet according to claim 1, wherein a cross sectional area of the beam is less than a cross sectional area of the column.

15. The energy storage cabinet according to claim 1, wherein the column is a steel pipe or a profile pipe.

16. An energy storage device, comprising:
an energy storage cabinet, comprising:
a plurality of columns arranged at intervals;
a plurality of beams, each connected between two adjacent columns, wherein the plurality of columns and the plurality of beams jointly enclose to form an accommodating space; and
a plurality of lifting assemblies connected to the plurality of columns respectively, wherein the lifting assembly comprises a lifting plate, the lifting plate is provided with a lifting hole, and the lifting hole is used to be hooked by a hook of a lifting machine to lift the energy storage cabinet,
wherein the lifting assembly further comprises:
a clamping plate, wherein the column is provided with a clamping part matching the clamping plate, the clamping plate is clamped in the clamping part, and the lifting plate is connected to the clamping plate, and
wherein the lifting plate is connected to the clamping plate by bolts.

17. The energy storage device according to claim 16, wherein the plurality of lifting assemblies are respectively connected to top ends of the plurality of columns.

18. The energy storage device according to claim 17, wherein the lifting plate comprises a first plate part and a second plate part connected vertically to each other, the lifting hole is arranged on the first plate part, and the second plate part is connected to the top end of the column.

\* \* \* \* \*